Figure 1:
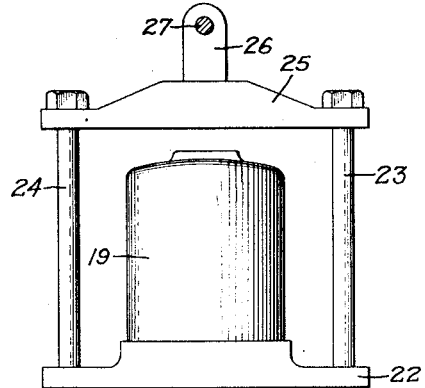

Feb. 13, 1934.    J. BARDIN    1,947,241

ELECTROHYDRAULIC OPERATING MECHANISM

Filed Oct. 8, 1932

Inventor:
Joseph Bardin,
by Charles E. Tullar
His Attorney.

Patented Feb. 13, 1934

1,947,241

UNITED STATES PATENT OFFICE 1,947,241

ELECTROHYDRAULIC OPERATING MECHANISM

Joseph Bardin, Versailles, France, assignor to General Electric Company, a corporation of New York Application October 8, 1932, Serial No. 636,876, and in France October 30, 1931

15 Claims. (Cl. 200—82)

My invention relates to improvements in electro-hydraulic operating mechanisms.

In this type of mechanism a casing or cylinder containing a fluid has mounted therein a piston. This piston moves within the casing in response to pressure created in the fluid by an electric motor driven impeller pump. The casing is mounted on a base usually by means of a pivotal mounting. The piston has a member movable therewith and extending through the casing for engaging a load to be operated upon. As soon as the electric motor driven pump is energized it starts building up a pressure in the fluid by transferring the fluid from one side of the piston to the other side of the piston, in response to which pressure the piston begins to move within the casing to exert a thrust on the load.

In the usual type of electro-hydraulic operating mechanism a constant speed motor is used to drive the pump although a variable speed motor could be used. The thrust exerted by the piston after the pump has attained full operating speed is practically constant throughout the travel of the piston. In various applications, however, it is desirable to vary the thrust according to the position of the piston in order to adapt the thrust to the resistance of the load being operated upon, which in most cases is variable throughout the travel of the piston from its inoperative position to the end of its stroke. Again it is sometimes desirable to slow up the movement of the piston at the end of the operating stroke to prevent impact between the piston and cylinder.

In other applications it is desirable to have full load thrust almost immediately upon operation of the hydraulic operating mechanism. Where there is practically no load, or where the initial load is light, the piston tends to move within the casing very rapidly and moves some distance before the motor and pump have reached full operating speed at which time full load thrust is developed by the operating mechanism. Hence in this case it would be desirable to prevent movement of the piston or to cause the piston to move at a very slow rate of speed until the motor and pump have attained full operating speed, at which time maximum thrust would be developed. A particular application of the electro-hydraulic operating mechanism is to high tension electric circuit breakers. In controllers of this kind it may be necessary to bring about the closing of the interrupter on a short circuit.

In applications to circuit breakers, the part of the travel between the open position and the beginning of the contact making position requires only a very slight thrust and for this reason the beginning of the piston travel is very rapid and the pump has no time to acquire sufficient speed so that the kinetic energy of the moving parts will suffice to complete the travel of the piston to fully close the contacts on the circuit breaker and permit a tripping thereof to reopen the circuit. On short circuit, at the moment when the contacts of the interrupter touch each other, at which time the motor driven pump has not reached full operating speed and has not developed full load thrust, the electro-hydraulic operating mechanism must overcome electro-dynamic effects. If the electro-hydraulic operating mechanism is connected to the same source of voltage, which supply is controlled by the circuit breaker when the contacts close on short circuit, the supply voltage becomes very low and the motor for driving the pump begins to drop in speed. Since the kinetic energy stored in the motor and pump is insufficient to complete the travel of the operating mechanism to close the circuit breaker completely, only slight pressure will be exerted on the contacts and the contacts will be burned and badly damaged and the breaker will probably not be tripped. At this instant therefore when the motor speed drops off, it is desirable to provide some means for instantly increasing the thrust exerted by the hydraulic operating mechanism to completely close the breaker to trip it. However, to do so by varying the speed of the motor and pump would be difficult and call for complicated control mechanism in addition to affecting the efficiency of the pump and motor combination. These last remarks apply with equal force to changing the thrust of the hydraulic operating mechanism by changing the speed of the motor during its movement from its initial position to the position at which the piston comes to rest at the end of its stroke.

Hence, an object of my invention is to vary the thrust of a hydraulic operating mechanism of the above type during its movement from initial position to the position at the end of its stroke independently of the variations in the pump speed.

Another object of my invention is to vary the pressure exerted on the piston of the hydraulic operating mechanism and the rate of movement of the piston throughout its stroke and to do this without changing the speed of the pump, thus maintaining maximum efficiency of the pump.

Another object of my invention is to provide a hydraulic operating mechanism of the above type in which the kinetic energy of the motor, pump and fluid may be instantly changed into static pressure at a predetermined point in the movement of the piston of the apparatus.

A further object of my invention is to provide an electro-hydraulic operating mechanism of the above type which will develop full load pressure during initial movement of the piston.

Another object of my invention is to vary the rate of movement of the piston along its path of travel, either gradually or in steps at intervals independently of the speed of the pump.

A further object of my invention is to provide a means for preventing impact at the ends of the operating stroke of an electro-hydraulic operating mechanism of the type described.

A still further object of my invention is to provide an electro-hydraulic operating mechanism which is provided with a simple and effective means for varying the thrust, the pressure, and rate of movement of the piston of the hydraulic operating mechanism without resorting to valve mechanisms, complicated controls and the like.

In the preferred embodiment of my invention a vertical casing or cylinder containing a fluid has a piston therein mounted for movement between two positions, the piston being biased to the bottom of the casing. The piston carries an impeller pump and a hollow support through which the drive shaft for the impeller pump extends. This hollow support extends through the top of the fluid casing and supports at its outer end an electric motor connected to said drive shaft for driving the impeller pump. The hollow support has attached thereto at its upper end, a work engaging member connected to the load. When the electric motor is energized, the pump forces fluid from the top side of the piston, through the piston, to the under side of the piston to create a pressure differential in the fluid to move the piston within the casing.

Ordinarily as soon as any pressure is developed beneath the piston the piston begins to move and will have moved for a short distance before the pump attains full operating speed and before the thrust reaches maximum thrust which remains constant for the rest of the stroke.

In order to accomplish variations of pressure beneath the piston and hence variations in the thrust of the piston during movement of the piston, as well as changing the rate of movement of the piston without resorting to electrical control means for controlling the speed of the motor and the pump, although this could be done by increasing the inner diameter of the cylinder at the desired points, I provide in the preferred embodiment of my invention slots or by-pass passages on the inside of the casing whereby fluid pumped from one side of the piston to the other side can leak back to the one side of the piston while the piston moves adjacent these slots or by-pass passages. Thus, wherever these slots or by-pass passages are placed within the casing adjacent the path of movement of the piston, since some of the fluid leaks back to the other side of the piston, the resultant developed pressure is less than that which would result if the by-pass passages had not been provided. This means that the thrust developed is less than full load thrust during movement of the piston past the by-pass passages. A change in the rate of movement of the piston also results when the load does not balance the thrust. Whenever the piston moves to close the by-pass passages kinetic energy of the motor and pump transmitted to the fluid is immediately changed to static pressure beneath the piston which instantaneously increases the pressure beneath the piston and the thrust exerted by the piston. The cross-sectional area of these by-pass passages and the position of these by-pass passages will determine the characteristics of the rate of movement, the developed pressure, and hence the thrust of the hydraulic operating mechanism. For example, if these by-pass passages are provided at the initial position of the piston at its biased position, it will be apparent that the piston will move very slowly until the piston has closed the by-pass passages by which time the pump has attained full operating speed and is capable of developing full load thrust. This means that during a very small movement of the piston the motor and pump will reach full operating speed. At the instant that the by-pass passages are closed the kinetic energy is changed to static pressure and full load thrust is exerted from this point to the end of the travel of the piston.

As pointed out, these by-pass passages may be placed at any point of the travel of the piston and they may be of varying lengths. Any combination can be designed for bringing about certain operating characteristics of the operating mechanism. Where the by-pass passages are made of varying lengths along the path of travel of the piston, it will be apparent that the pressure exerted on the piston and the thrust exerted by the piston will be changed in steps as the piston moves within the casing. If the load operated upon is constant, the speed of the piston travel will of course vary in proportion to the increase in pressure beneath the piston. If the slots or by-pass passages are placed at the top of the cylinder at the end of the piston stroke, the piston will slow up at the end of the stroke and prevent impact.

Figure 3:
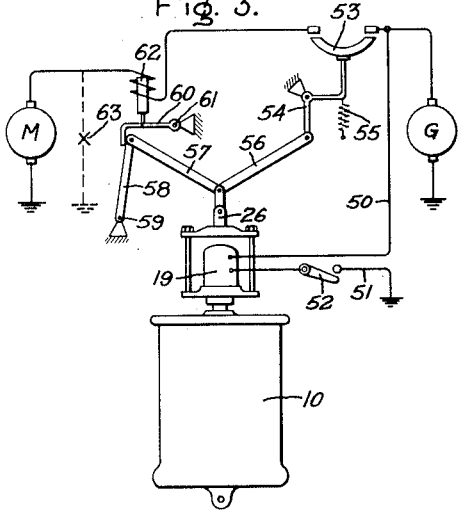
Figure 2:
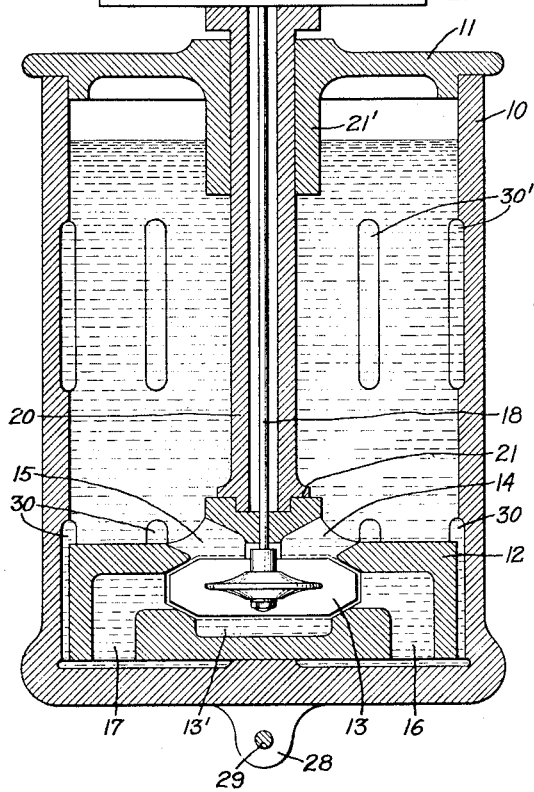
Figure 2:
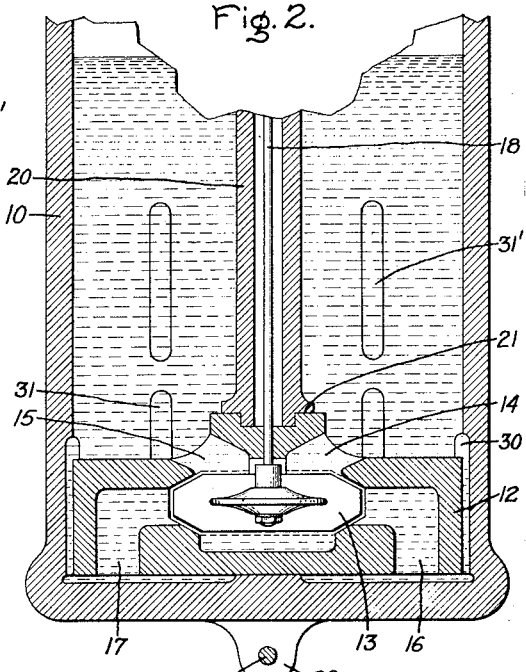

Referring to the drawing, Fig. 1 shows a cross-section of my electro-hydraulic operating mechanism and the by-passing passages therein. Fig. 2 is a modification of my invention showing by-passing passages at different positions and varying lengths. Fig. 3 shows an application of my hydraulic operating mechanism to a circuit breaker.

Referring to the drawing, in Fig. 1, the casing 10 provided with the cover 11 having a stop 21' contains a fluid in which the piston 12 is immersed. This piston carries and provides a housing for the impeller 13 and during operation draws in fluid through the intake passages 14 and 15 from the top of the piston and expels it through the exhaust passages 16 and 17 to the under side of the piston. This creates a pressure beneath the piston for moving the piston upwardly within the casing. End thrust on the impeller is prevented by providing chamber 13' beneath the impeller to balance the fluid pressure on both sides thereof.

The piston 12 has mounted thereon at 21 the supporting hollow tube 20 through which the driving shaft 18 extends. This supporting tube supports the cross member 22 and the push rods 23 and 24, which engage the cross member 25 which in turn supports the work-engaging member 26 which is pivotally connected at 27 to a load, not shown.

The cross member 22 also supports the electric driving motor 19 connected to the impeller 13 by means of the driving shaft 18. The casing 10 is pivotally mounted at 29 by means of the pivotal connection 28. Slots or by-pass passages 30 are cut into the side of the fluid casing adjacent the biased position of the piston 12.

The operation of the mechanism is as follows: When the motor 19 is energized it rotates the impeller 13, and as previously pointed out, transfers fluid from the top side of the piston 12 to the under side of the piston. This tends to build up a pressure beneath the piston to move the same upwardly within the casing. However, since some of the fluid is by-passed back to the top of the piston through the slots 30, the resultant pressure is considerably less than it would otherwise be and the initial movement of the piston is slow. By the time that the top of the piston has reached the top of the by-pass passages 30 to prevent further by-passing of the fluid, the pump will have attained full operating speed so that from this position to the end of the stroke, the full operating pressure will be exerted on the piston to provide full load thrust of the operating mechanism. At the instant that the by-pass passages 30 are covered or closed by the piston, the kinetic energy of the motor and pump which has been transmitted to the part of the fluid being by-passed is immediately entirely converted into static pressure beneath the piston so that the pressure increases instantly to some greater value than when part of the fluid was being by-passed. This, of course, has the effect of tremendously increasing the thrust exerted by the piston at this instant. It will be apparent that if these by-pass passages were not provided the piston 12 would have moved considerably further than the top of the slots 30 before the motor and pump had reached full operating speed and developed full operating pressure. Thus, in applications where slots are not provided the peak load will be engaged by the operating mechanism before full load thrust is developed thereby resulting in a weak operation.

The slots 30' in the upper part of the casing may or may not be provided. The purpose of these slots is to prevent shock by slowing up the movement of the piston as it approaches the end of its stroke. These slots by-pass fluid from one side of the piston to the other side of the piston when the piston approaches its upper limit of movement thus acting to decrease the rate of movement of the piston.

In Fig. 3, the electro-hydraulic operating mechanism is shown connected to a circuit breaker having a switch member 53 which controls the circuit for the load M from the source of supply G to which the motor 19 of the operating mechanism 10 is connected. This circuit breaker may be of the type shown in the Rankin Patent #1,696,-582, which is a mechanism that trips the switch member free in case of a short circuit. This circuit breaker is shown diagrammatically and comprises the bell crank 54 pivotally mounted at a fixed point and connected to the switch member 53 which is biased to open position by means of the spring 55. The electro-hydraulic operating mechanism is connected at 26 to the links 56 and 57, the link 57 being connected to the link 58 pivoted at the fixed point 59. The latch member 60 is pivoted at the fixed point 61 and during normal operation acts to prevent movement of link 58 so that as the operator moves upwardly the bell crank 54 will be rotated in a counter-clockwise direction to close the switch 53. Ordinarily the current flowing through the supply lines is insufficient to actuate the solenoid 62 which is a simplified diagrammaic showing of the solenoid and its energizing means of the Rankin patent referred to. If a short occurs on the lines at, for example, point 63, the short circuit current is sufficient to actuate the solenoid 62 to rotate latch 60 in a clockwse direction to release the same. With no fulcrum for the link 58 and since the bias spring 55 is effective, the operating mechanism will not close switch 53 but will simply operate the link mechanisms 56, 57, and 58. Under short circuit conditions, the switch 53 will be badly burned if it is not firmly closed. Due to the high resistance between contacts when not firmly closed, switch 53 may, in an extreme condition, fail to operate latch 60 until considerable damage has been done. The motor 19 is energized through conductors 50 and 51, the switch 52 controlling the circuit thereto.

In operation, if there is a short circuit on the line at the point 63 at the instant that the switch 53 is closed, the speed of the motor 19 will tend to drop due to the drop in voltage in the lines caused by the short circuit current. This, of course, reduces the pressure developed by the pump, and if some means is not provided for compensating for this loss in pressure on the piston due to the reduced speed of the motor, the piston will either drop due to lack of pressure underneath the same, or will maintain its position, or will very slowly close until the latch 60 is released, all of which actions will be undesirable since full closing of the contacts to prevent arcing and to energize coil 62 to trip the breaker on short circuit is desired. While the piston is travelling from its biased position to the top of the slots 30, the motor and pump will have sufficient time to come up to full speed storing up kinetic energy which is transmitted in part to the fluid being by-passed. If the slots are so arranged that at the instant the switch is closed, the by-pass passages 30 will be closed by the piston, it will be apparent that although at this instant the motor speed will tend to decrease due to the lowered voltage, the kinetic energy of the motor and impeller which has been transmitted to the fluid being by-passed, will be instantly changed to static pressure to increase the thrust of the piston. This ensures quick full closure of the switch 53 and thus prevents arcing at the contacts. Proper operation of the solenoid operated latch will thus be assured.

In the modification shown in Fig. 2, other slots 31 of greater length than the slots 30 are provided. Thus, when the piston 12 has reached the top of the slots 30 to prevent by-passing of fluid through these passages, fluid will continue to be by-passed, but to a lesser extent through the passages 31 until the piston has passed the top of these passages. This causes variation of the pressure exerted on the piston and hence change in thrust of the piston in steps. Slots or by-pass passages such as 31' can be placed at any point in the travel of the piston and can be made of any cross-sectional area to vary the operating characteristics of the operating mechanism with respect to the rate of movement of the piston and developed pressure thereon with the corresponding variation of thrust on the load engaged.

It will thus be apparent that by means of my invention I have provded a very simple and effective method of varying the pressure and thrust characteristics of my electro-hydraulic operating mechanism as well as rate of movement of the piston without affecting the operating speed of the pump and thus its efficiency by using an electrical control to obtain these characteristics.

The embodiment of the invention illustrated and described herein has been selected for the purpose of clearly setting forth the principles involved. It will be apparent, however, that the invention is susceptible of being modified to meet the different conditions in its use and I therefore aim to cover by the appended claims all modifications within the true spirit and scope of my invention.

What I claim as new and desire to secure by Letters Patent of the United States is:

1. An electro-hydraulic operating mechanism including a cylinder having a fluid therein, a piston in said cylinder movable between two positions and biased to one of said positions, an electric motor driven pump for transferring fluid from one side of said piston to the other side of said piston for creating a pressure in said fluid to move said piston from the biased position to the other position when said pump is energized, and means controlled by movement of the piston for by-passing a portion of said fluid from said other side of the piston to said one side of the piston during a part of the travel of said piston between said positions.

2. An electro-hydraulic operating mechanism including a cylinder having a fluid therein, a piston in said cylinder movable between two positions and biased to one of said positions, an electric motor-driven pump for transferring fluid from one side of said piston to the other side of said piston for creating a pressure in said fluid to move said piston from the biased position to the other position when said pump is energized, and slots on the inside of said cylinder and controlled by movement of the piston for by-passing a portion of said fluid from said other side of the piston to said one side of the piston during a part of the travel of said piston between said positions.

3. An electro-hydraulic operating mechanism including a cylinder having a fluid therein, a piston in said cylinder movable between two positions and biased to one of said positions, an electric motor driven pump for creating a pressure in the fluid for moving said piston from said biased position to said other position, fluid by-passing means controlled by movement of said piston and effective to cause said piston to move slowly during the initial movement thereof from said biased position to said other position when said electric motor driven pump is energized whereby said pump may attain full operating speed to develop full load pressure on said piston during said initial movement.

4. An electro-hydraulic operating mechanism including a cylinder having a fluid therein, a piston in said cylinder movable between two positions and biased to one of said positions, an electric motor driven pump for transferring fluid from one side of said piston to the other side of said piston for creating a pressure in said fluid to cause movement of said piston from said biased position to said other position, means controlled by movement of said piston for by-passing a portion of said fluid from said other side of the piston to said one side of the piston during initial movement of said piston when said electric motor driven pump is energized whereby said pump will have attained full operating speed to exert full load pressure on said piston when said by-passing means is rendered ineffective by said piston in its movement.

5. An electro-hydraulic operating mechanism including a cylinder having a fluid therein, a piston in said cylinder movable between two positions and biased to one of said positions, an electric motor driven impeller pump carried by said piston for transferring fluid from one side of said piston to the other side of said piston for creating a pressure in said fluid for moving said piston from said biased position to said other position when said electric motor driven pump is energized, said cylinder having by-pass slots adjacent the path of movement of said piston for by-passing a portion of said fluid from said other side of the piston to said one side of the piston during movement of said piston past said slots, said piston in its movement from said biased position to said other position rendering said by-pass slots ineffective.

6. An electro-hydraulic operating mechanism including a cylinder having a fluid therein, a piston in said cylinder movable between two positions and biased to one of said positions, an electric motor driven pump for transferring fluid from one side of said piston to the other side of said piston for creating a pressure in said fluid to cause movement of said piston from said biased position to its other position when said electric motor driven pump is energized, said cylinder having slots on the inside thereof for by-passing a portion of the fluid from said other side of the piston to said one side of the piston during movement of the piston, said piston rendering said by-passing means ineffective during movement thereof between said positions whereby the pressure exerted on said piston and the thrust exerted by said piston is varied during movement of said piston independently of variations in the speed of said pump.

7. An electro-hydraulic operating mechanism including a cylinder having a fluid therein, a piston in said cylinder movable between two positions and biased to one of said positions, a constant speed electric motor driven pump for transferring fluid from one side of said piston to the other side of said piston for creating a pressure in said fluid to cause movement of said piston from said biased position to said other position, means controlled by movement of said piston for by-passing a portion of said fluid from said other side of the piston to said one side of the piston during movement of said piston between said positions whereby the rate of movement of said piston is varied during movement of said piston.

8. An electro-hydraulic operating mechanism including a cylinder having a fluid therein, a piston in said cylinder movable between two positions and biased to one of said positions, an electric motor driven pump for transferring fluid from one side of said piston to the other side of said piston for creating a pressure in said fluid to cause a movement of said piston from said biased position to said other position when the motor is energized, means effective to by-pass a portion of the fluid from said other side of the piston to said one side of the piston during movement of the piston from said biased position to said other position, said by-passing means being rendered ineffective by said piston during movement thereof whereby the kinetic energy of said pump transmitted to said fluid is transformed into static pressure in said fluid for instantaneously increasing the thrust exerted by said piston.

9. An electro-hydraulic operating mechanism including a cylinder having a fluid therein, a piston in said cylinder movable between two positions and biased to one of said positions, an electric motor driven pump for transferring fluid from one side of said piston to the other side of said piston for creating a pressure in said fluid to cause movement of said piston from said biased position to said other position, said cylinder having slots on the inside thereof for by-passing a portion of the fluid from said other side of the piston to said one side of the piston during movement of said piston, said slots being rendered ineffective by said piston during the movement thereof between said positions, whereby the kinetic energy of said pump transmitted to said fluid is transformed into static pressure in said fluid for instantaneously varying the thrust exerted by said piston.

10. An electro-hydraulic operating mechanism including a cylinder having a fluid therein, a piston in said cylinder movable between two positions and biased to one of said positions, a constant speed electric motor driven pump for transferring fluid from one side of said piston to the other side of said piston to create a pressure in said fluid to move said piston from said biased position to the other position when said electric motor driven pump is energized, means for by-passing a part of said fluid from said other side of the piston to said one side of the piston to cause said piston to move slowly and effective only during a part of the movement of said piston from biased position to said other position and other means for by-passing a smaller part of said fluid from said other side of the piston to said one side of the piston and effective during another part of the movement of said piston from said biased position to said other position whereby the rate of movement of said piston is varied during said other part of the movement of said piston, said piston moving at a different rate when said second means becomes ineffective.

11. An electro-hydraulic operating mechanism including a cylinder having a fluid therein, a piston in said cylinder movable between two positions and biased to one of said positions, an electric motor driven pump carried by said piston for transferring fluid from one side of said piston to the other side of said piston for creating a pressure in said fluid to move said piston from said biased position to said other position, said cylinder having a plurality of by-pass slots of varying lengths on the inside thereof adjacent the path of travel of said piston for by-passing fluid from said other side of the piston to said one side of the piston when said pump is energized during movement of said piston between said positions, said piston during movement from its biased position to said other position rendering said by-passing passages successively ineffective whereby the pressure exerted on said piston is varied in steps to vary the thrust exerted by said piston during movement thereof.

12. An electro-hydraulic operating mechanism including a cylinder having a fluid therein, a piston in said cylinder movable between two positions and biased to one of said positions, an electric motor driven pump for transferring fluid from one side of said piston to the other side of said piston to move said piston from its biased position to the other position, said cylinder having slots on the interior thereof adjacent said other position for by-passing fluid from said other side of the piston to said one side of the piston during movement of said piston, said slots being rendered effective by said piston during movement of said piston to the other position whereby the rate of movement of said piston to said other position may be retarded to prevent impact at the end of the movement of said piston.

13. In combination, a circuit breaker biased to open position, an electro-hydraulic operating mechanism therefor for closing said circuit breaker including a cylinder having fluid therein, a piston in said cylinder connected to said circuit breaker and movable between two positions, an electric motor-driven pump for transferring fluid from one side of said piston to the other side of said piston for creating a pressure in the fluid for moving said piston from one of said positions to the other position to close said circuit breaker, means for by-passing part of said fluid around said piston during movement thereof from said one position to said other position, said by-passing means being rendered ineffective by said piston at the instant said circuit breaker is closed, whereby the kinetic energy of said pump transmitted to said fluid is transformed to static pressure to instantaneously increase the thrust exerted by said piston on said circuit breaker.

14. In combination, a circuit breaker biased to open position, an electro-hydraulic operating mechanism therefor including a cylinder having a fluid therein, a piston in said cylinder connected to said circuit breaker and movable between two positions, an electric motor-driven pump for transferring fluid from one side of said piston to the other side of said piston for creating a pressure in the fluid for moving said piston from one of said positions to the other position to close said circuit breaker, means for by-passing part of said fluid around said piston during initial movement thereof from said one position to said other position, said pump during said initial movement attaining full operating speed, said by-passing means being rendered ineffective by said piston at the instant said circuit breaker is closed, whereby the kinetic energy of said pump transmitted to said fluid is transformed to static pressure to instantaneously increase the thrust exerted by said piston on said circuit breaker.

15. An electro-hydraulic operating mechanism including a cylinder having a fluid therein, a piston in said cylinder movable between two positions and biased to one of said positions, an electric motor supported by said piston and movable therewith, a pump connected to said motor and carried by said piston for transferring fluid from one side of said piston to the other side of said piston for creating a pressure in said fluid for moving said piston from said biased position to said other position when said electric motor is energized, said cylinder having by-passing slots of a length greater than the width of said piston adjacent the path of movement of said piston for by-passing a portion of said fluid from said other side of the piston to said one side of the piston during movement of said piston past said slots, said piston in its movement from said biased position to said other position rendering said by-pass slots ineffective.

JOSEPH BARDIN.